United States Patent
Sorkin

(10) Patent No.: US 11,603,953 B2
(45) Date of Patent: *Mar. 14, 2023

(54) BAYONET DUCT COUPLER ASSEMBLY FOR POST-TENSIONED CONCRETE MEMBER

(71) Applicant: Felix Sorkin, Stafford, TX (US)

(72) Inventor: Felix Sorkin, Stafford, TX (US)

(*) Notice: Subject to any disclaimer, the term of this patent is extended or adjusted under 35 U.S.C. 154(b) by 483 days.

This patent is subject to a terminal disclaimer.

(21) Appl. No.: 16/825,804

(22) Filed: Mar. 20, 2020

(65) Prior Publication Data

US 2020/0217439 A1 Jul. 9, 2020

Related U.S. Application Data

(62) Division of application No. 15/402,826, filed on Jan. 10, 2017, now Pat. No. 10,634,271.

(Continued)

(51) Int. Cl.
*F16L 37/248* (2006.01)
*E04C 5/10* (2006.01)
(Continued)

(52) U.S. Cl.
CPC .............. *F16L 37/248* (2013.01); *B28B 1/30* (2013.01); *E04C 5/10* (2013.01); *F16L 13/116* (2013.01);
(Continued)

(58) Field of Classification Search
CPC ... B21D 11/12; B28B 1/30; E04C 5/10; F16L 13/00; F16L 13/113; F16L 13/116;
(Continued)

(56) References Cited

U.S. PATENT DOCUMENTS 2,230,098 A * 1/1941 Wurzburger .......... F16L 37/248
285/361
2,591,531 A * 4/1952 Fishback ................. F16L 37/23
285/83

(Continued)

FOREIGN PATENT DOCUMENTS

| FR | 1377585 A | 11/1964 |
| JP | H09257175 A | 9/1997 |
| WO | 2010025877 A | 3/2010 |

OTHER PUBLICATIONS

Extended European Search Report issued in EP Patent No. 17151184.3, dated Apr. 25, 2017 [From Parent U.S. Appl. No. 15/402,826, filed Jan. 10, 2017].

(Continued)

*Primary Examiner* — Jessie T Fonseca
(74) *Attorney, Agent, or Firm* — Hunton Andrews Kurth LLP

(57) ABSTRACT

A duct coupler assembly includes a female duct coupler, where the female duct coupler is coupled to a first duct segment. The female duct coupler includes a female duct coupler body having an inner surface having an inner diameter and a bayonet slot formed therein. The duct coupler assembly further includes a male duct coupler. The male duct coupler is coupled to a second duct segment. The male duct coupler includes a male duct coupler body having an outer surface having an outer diameter, where the outer diameter is smaller than the inner diameter of the inner surface of the female duct coupler body. The male duct coupler has a bayonet post extending from an outer surface of the male duct coupler body, and the male duct coupler body is positioned within the female duct coupler body such that the bayonet post is positioned within the bayonet slot wherein the male duct coupler is coupled with the female duct coupler.

13 Claims, 8 Drawing Sheets

Related U.S. Application Data

(60) Provisional application No. 62/291,247, filed on Feb. 4, 2016.

(51) Int. Cl.
*B21D 11/12* (2006.01)
*B28B 1/30* (2006.01)
*F16L 13/11* (2006.01)
*F16L 13/00* (2006.01)

(52) U.S. Cl.
CPC .............. *B21D 11/12* (2013.01); *F16L 13/00* (2013.01); *Y10T 29/49632* (2015.01)

(58) Field of Classification Search
CPC ... F16L 25/0027; F16L 37/107; F16L 37/248; Y10T 29/49632
See application file for complete search history.

(56) References Cited

U.S. PATENT DOCUMENTS

| | | | |
|---|---|---|---|
| 3,104,896 A * | 9/1963 | Kennedy, Jr. | F16L 37/248 285/361 |
| 3,248,129 A * | 4/1966 | Brown | E21B 17/06 175/320 |
| 4,140,422 A | 2/1979 | Crumpler, Jr. | |
| 4,306,743 A * | 12/1981 | Hinshaw | F16L 37/248 285/260 |
| 4,708,370 A | 11/1987 | Todd | |
| 5,474,335 A | 12/1995 | Sorkin | |
| 5,517,330 A | 5/1996 | Maeda | |
| 5,775,849 A | 7/1998 | Sorkin | |
| 5,954,373 A * | 9/1999 | Sorkin | F16L 37/18 285/903 |
| 5,957,376 A | 9/1999 | Sorkin | |
| 6,206,433 B1 | 3/2001 | Bloomer | |
| 6,550,816 B1 | 4/2003 | Sorkin | |
| 6,659,135 B2 | 12/2003 | Sorkin | |
| 6,666,233 B1 | 12/2003 | Sorkin | |
| 6,752,435 B1 | 6/2004 | Sorkin | |
| 6,764,105 B1 | 7/2004 | Sorkin | |
| 6,834,890 B2 | 12/2004 | Sorkin | |
| 6,843,031 B1 | 1/2005 | Sorkin | |
| 6,874,821 B1 | 4/2005 | Sorkin | |
| 6,889,714 B1 | 5/2005 | Sorkin | |
| 7,267,375 B1 | 9/2007 | Sorkin | |
| 7,273,238 B1 | 9/2007 | Sorkin | |
| 7,621,103 B1 | 11/2009 | Sorkin | |
| 7,686,347 B1 | 4/2010 | Sorkin | |
| 7,695,021 B1 | 4/2010 | Sorkin | |
| 8,016,326 B1 | 9/2011 | Sorkin | |
| 8,398,123 B1 | 5/2013 | Sorkin | |
| 8,640,292 B1 | 2/2014 | Sorkin | |
| 9,134,840 B2 | 9/2015 | Rekimoto | |
| 9,399,869 B2 | 7/2016 | Sorkin | |
| 9,423,059 B1 | 8/2016 | Sorkin | |
| 9,493,951 B2 | 11/2016 | Sorkin | |
| 9,803,788 B1 * | 10/2017 | Sorkin | F16L 25/0054 |
| 2003/0034651 A1 | 2/2003 | Neubauer et al. | |
| 2004/0056483 A1 * | 3/2004 | Sorkin | F16L 25/0018 285/230 |
| 2007/0252389 A1 * | 11/2007 | Milici | F16L 25/0036 285/369 |
| 2011/0179590 A1 | 7/2011 | Klimas | |
| 2012/0298248 A1 * | 11/2012 | Schwager | F16L 9/06 138/173 |
| 2015/0097369 A1 | 4/2015 | Bernardo | |
| 2015/0211665 A1 * | 7/2015 | Sorkin | F16L 13/116 285/417 |
| 2015/0330078 A1 | 11/2015 | Sorkin | |

OTHER PUBLICATIONS

Extended European Search Report dated Apr. 19, 2022 issued in EP 22150601.7.

* cited by examiner

BAYONET DUCT COUPLER ASSEMBLY FOR POST-TENSIONED CONCRETE MEMBER

CROSS-REFERENCE TO RELATED APPLICATIONS

This application is a divisional application that claims priority to nonprovisional application Ser. No. 15/402,826 filed Jan. 10, 2017, which claims priority from U.S. provisional application No. 62/291,247, filed Feb. 4, 2016, which is incorporated by reference herein in its entirety.

TECHNICAL FIELD/FIELD OF THE DISCLOSURE

The present disclosure relates generally to a conduit coupling device. The present disclosure relates more specifically to a duct coupler assembly for providing a joint between adjacent sections of conduit.

BACKGROUND OF THE DISCLOSURE

Structural concrete, though capable of carrying very high compressive loads, is generally weak in carrying tensile loads on its own. Reinforced concrete ameliorates this deficiency by including an internal structure formed from materials capable of withstanding tensile forces within an otherwise solid concrete structure. Metal bars or cables are often used due to their high tensile strength and relative ease of manufacture.

In order to further improve the tensile capacities of reinforced concrete structures, the reinforcement structure may be pre- or post- tensioned. Added structural tension maintains a compression loading on the concrete member, even when tensile stress would otherwise occur, such as in beam-loading.

In post-tensioned concrete, the reinforcing structure is tensioned after the concrete has set. In one form of post-tensioned concrete, a series of conduits formed from duct segments are placed within the concrete form, each conduit positioned parallel to the desired tensile pre-loading. The conduits are threaded with the one or more tensile members, such as metal cables. After the concrete has set, the metal cables may then be placed under tension, and anchored to either end of the conduit, thus placing the concrete member under tensile loading.

Where a concrete member is to be poured adjacent to an existing concrete member, such as, for example, in a balanced cantilever construction bridge, the duct segments in the existing concrete member are traditionally be coupled to ducts placed in the form of the new concrete member.

SUMMARY

The present disclosure provides a duct coupler assembly. The duct coupler assembly includes a female duct coupler. The female duct coupler is coupled to a first duct segment. The female duct coupler includes a female duct coupler body having an inner surface with an inner diameter. The female duct coupler has a bayonet slot. The duct coupler assembly also includes a male duct coupler. The male duct coupler is coupled to a second duct segment. The male duct coupler includes a male duct coupler body having an outer surface with an outer diameter. The outer diameter is smaller than the inner diameter of the inner surface of the female duct coupler body. The male duct coupler has a bayonet post extending from an outer surface of the male duct coupler body. The male duct coupler is coupled with the female duct coupler wherein a portion of the male duct coupler body is positioned within the female duct coupler body and the bayonet post is positioned within the bayonet slot.

The present disclosure further provides for a method. The method includes forming a first concrete element, the first concrete element having a first duct segment positioned therein and extending from an end of a first concrete element. The method also includes positioning a form adjacent to the end of the first concrete element and providing a duct coupler assembly. The duct coupler assembly includes a female duct coupler. The female duct coupler includes a female duct coupler body having an inner surface with an inner diameter. The female duct coupler has a bayonet slot. The duct coupler assembly also includes a male duct coupler. The male duct coupler includes a male duct coupler body having an outer surface with an outer diameter. The outer diameter is smaller than the inner diameter of the inner surface of the female duct coupler body. The male duct coupler has a bayonet post extending from an outer surface of the male duct coupler body. The method also includes coupling a first duct coupler of the duct coupler assembly to the first duct segment and coupling a second duct coupler of the duct coupler assembly to a second duct segment. In addition, the method includes coupling the second duct segment to the first duct segment by inserting the male duct coupler into the female duct coupler such that the bayonet post enters the bayonet slot, rotating the second duct segment to retain the bayonet post in the bayonet slot, and pouring concrete into the form to form a second concrete element having the second duct section positioned therein.

The present disclosure further provides a duct coupler assembly. The duct coupler assembly includes a female duct coupler. The female duct coupler includes a female duct coupler body having an inner surface having an inner diameter. The female duct coupler has a bayonet slot. The duct coupler assembly also includes a male duct coupler. The male duct coupler includes a male duct coupler body having an outer surface with an outer diameter. The outer diameter is smaller than the inner diameter of the inner surface of the female duct coupler body. The male duct coupler has a bayonet post extending from the outer surface of the male duct coupler body. The male duct coupler is coupled with the female duct coupler wherein a portion of the male duct coupler body is positioned within the female duct coupler body and the bayonet post is positioned within the bayonet slot.

The present disclosure further provides a duct coupler assembly. The duct coupler assembly may include a female duct coupler. The female duct coupler may be coupled to a first duct segment and may have a bayonet slot. The duct coupler assembly may further include a male duct coupler. The male duct coupler may be coupled to a second duct segment. The male duct coupler may have a bayonet post extending from an outer surface of the male duct coupler. The male duct coupler may be separably coupled to the female duct coupler, and at least a portion of the male duct coupler may be positioned within the female duct coupler. The bayonet post may be positioned within the bayonet slot.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
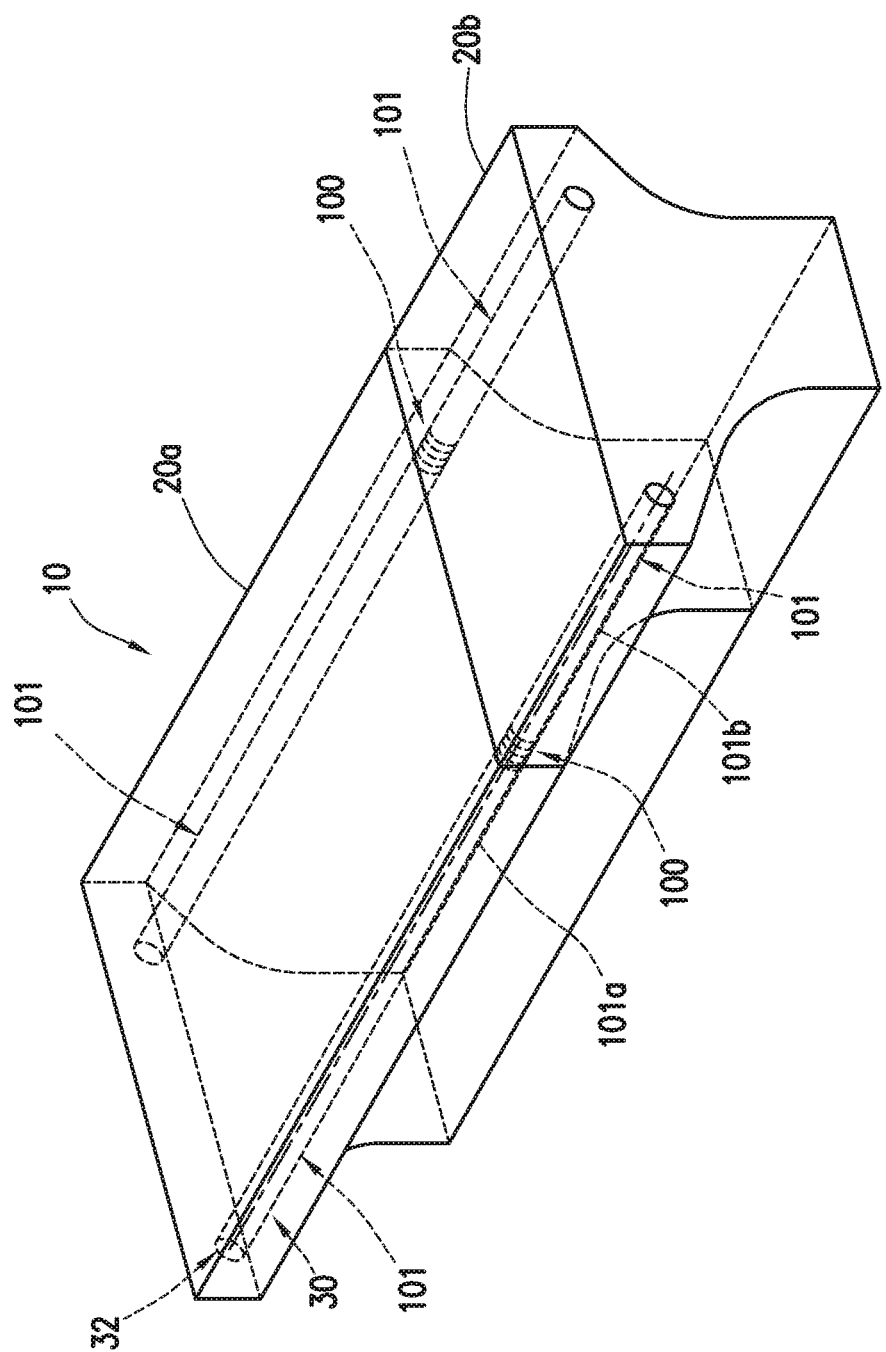
FIG. 1 is a perspective view of concrete members having ducts coupled with a duct coupler assembly consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts post-tensioned concrete structure 10 having first concrete element 20a and second concrete element 20b. Although depicted as bridge segments, one having ordinary skill in the art with the benefit of this disclosure will understand that any concrete elements may be used as described herein without deviating from the scope of this disclosure. In some embodiments, first concrete element 20a may be poured before second concrete element 20b. In some embodiments, second concrete element 20b may be poured in a form (not shown) such that second concrete element 20b is adjacent to first concrete element 20a.

In some embodiments, one or more duct segments 101 for post tensioning concrete structure 10 may be positioned within concrete elements 20a and 20b. In some embodiments, first duct segment 101a may be positioned in first concrete element 20a and second duct segment 101b may be positioned in second concrete element 20b. In some embodiments, duct segments 101 may be formed integrally within concrete elements 20a and 20b of concrete structure 10 by pouring concrete around duct segments 101a and 101b, respectively. In some embodiments, conduit 30 may be formed as a continuous tube made up of duct segments 101, such as duct segments 101a and 101b, which are coupled together by duct coupler assemblies 100 at the interfaces between adjacent concrete elements, such as concrete elements 20a and 20b. Duct coupler assembly 100 may, for example, structurally connect first duct segment 101a and second duct segment 101b as well as form a seal to restrict concrete and other fluids from entering the interior of conduit 30. Duct segments 101 may be piping, duct, or any other appropriate material for use in post-tension concrete.

At least one tensioning member such as, for example, metal cable 32 may be threaded through conduit 30. Metal cable 32 may later be placed under tension after the concrete has been poured. An anchor may be affixed to each end of metal cable 32 to hold it under tension.

Figure 2:
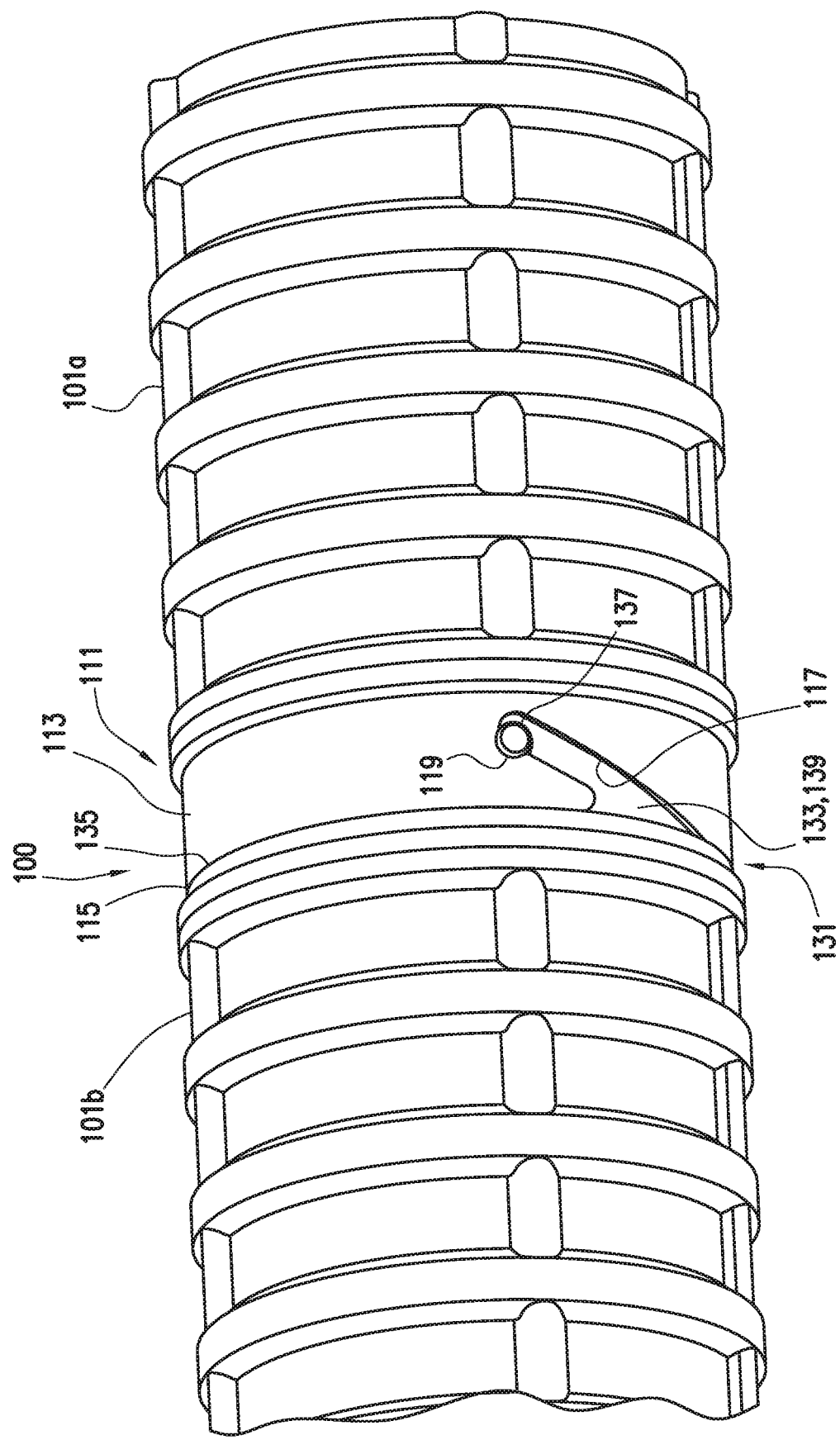
FIG. 2 is a side view of a duct coupler assembly consistent with at least one embodiment of the present disclosure.
Figure 3:
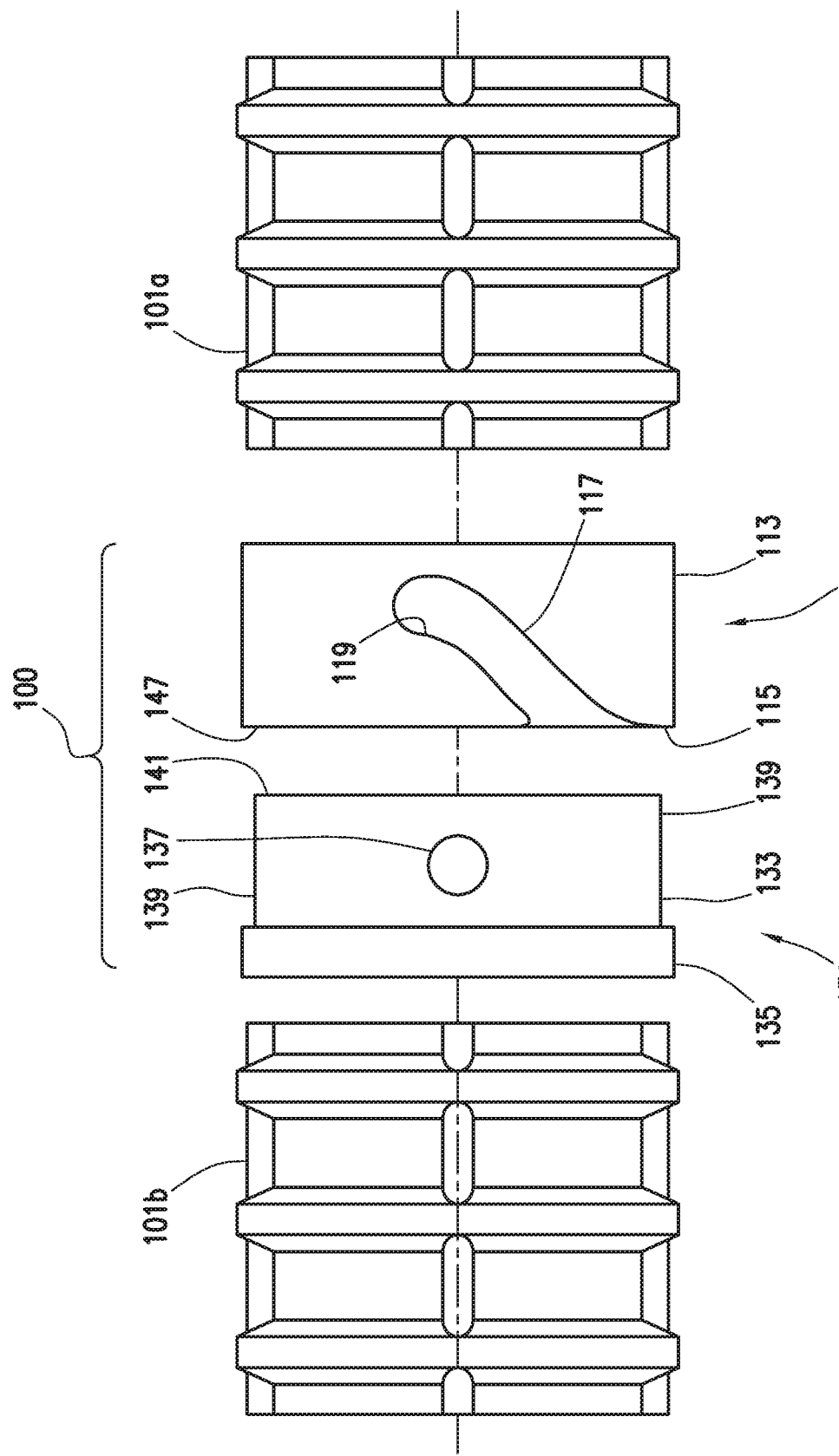
FIG. 3 is an exploded view of the duct coupler assembly of FIG. 2.
Figure 4:
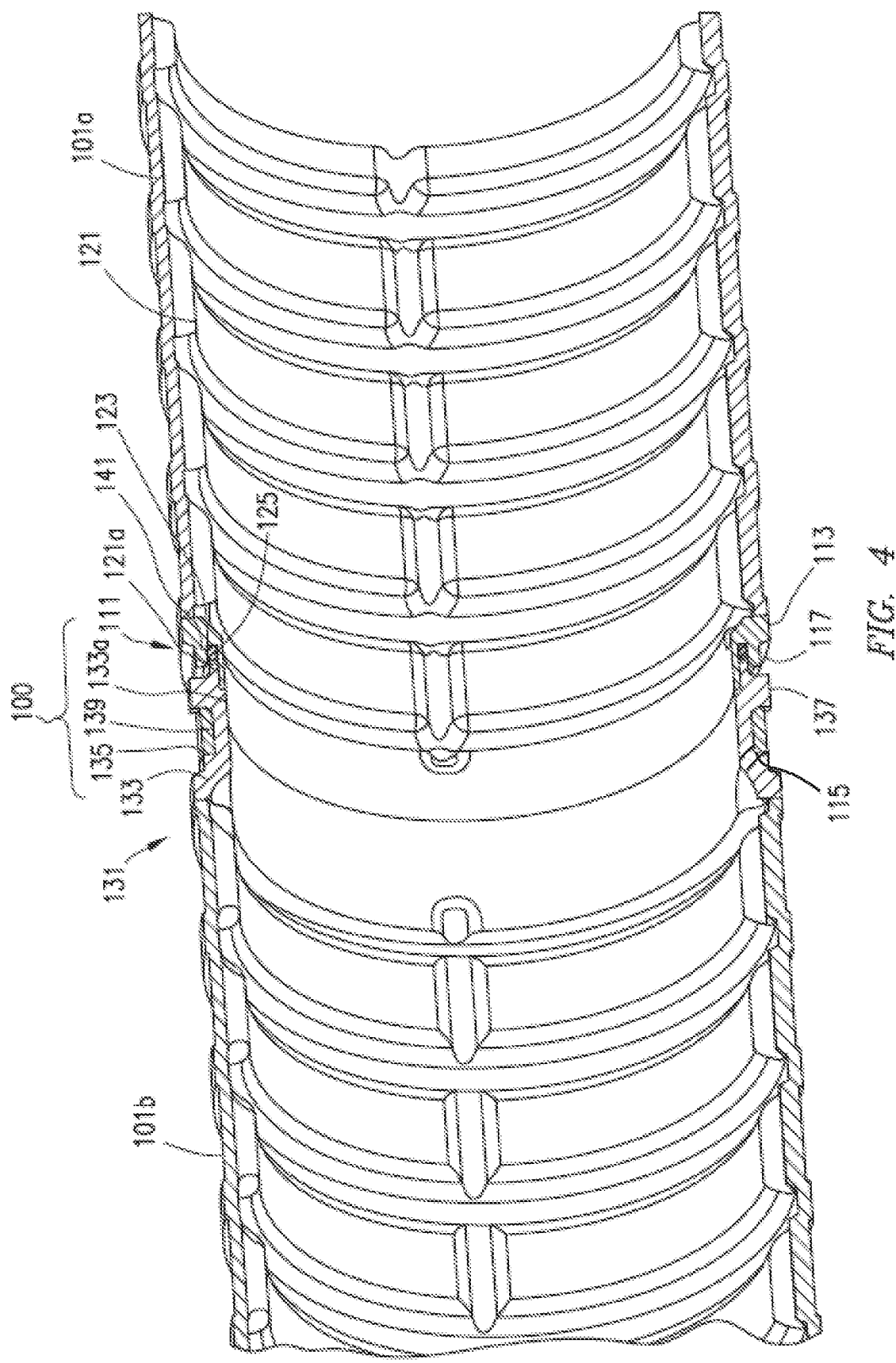
FIG. 4 is a cross section view of the duct coupler assembly of FIG. 2.

FIGS. 2-4 depict duct coupler assembly 100 in accordance with embodiments of the present disclosure. Duct coupler assembly 100 may include female duct coupler 111 coupled to first duct segment 101a and male duct coupler 131 coupled to second duct segment 101b. Female duct coupler 111 and male duct coupler 131 may be separably coupleable, i.e., female duct coupler 111 and male duct coupler 131 may be uncoupled after being coupled. In some embodiments, female duct coupler 111 and male duct coupler 131 may be coupled to the respective duct segment 101a and 101b, for example and without limitation, press fitting, mechanical welding, chemical welding, friction welding, thermal coupling, thermal welding, a shrink sleeve, an O-ring or diametric seal, or one or more adhesives. In some embodiments, one or both of female duct coupler 111 or male duct coupler 131 may be formed integrally as the end of the respective duct segment 101a, 101b. In some embodiments, female duct coupler 111 may be coupled to first duct segment 101a after first concrete element 20a is formed. One having ordinary skill in the art with the benefit of this disclosure will understand that the specific arrangement of female duct coupler 111 and male duct coupler 131 with respect to duct segments 101a and 101b discussed is merely exemplary and not intended to be limiting. Either duct coupler, i.e. female duct coupler 111 or male duct coupler 131, may be coupled to either duct segment without deviating from the scope of this disclosure.

In some embodiments, female duct coupler 111 may include female duct coupler body 113. In some embodiments, male duct coupler 131 may include male duct coupler body 133. In some embodiments, outer surface 139 of male duct coupler body 133 may have an outer diameter smaller than the inner diameter of inner surface 147 of the female duct coupler body 113 such that at least a portion of male duct coupler body 133 may fit within female duct coupler body 113. In some embodiments, male duct coupler 131 may include male coupler flange 135 positioned to abut female edge 115 of female duct coupler 111, resisting further insertion of male duct coupler body 133 into female duct coupler body 113 as discussed further below.

Figure 5:
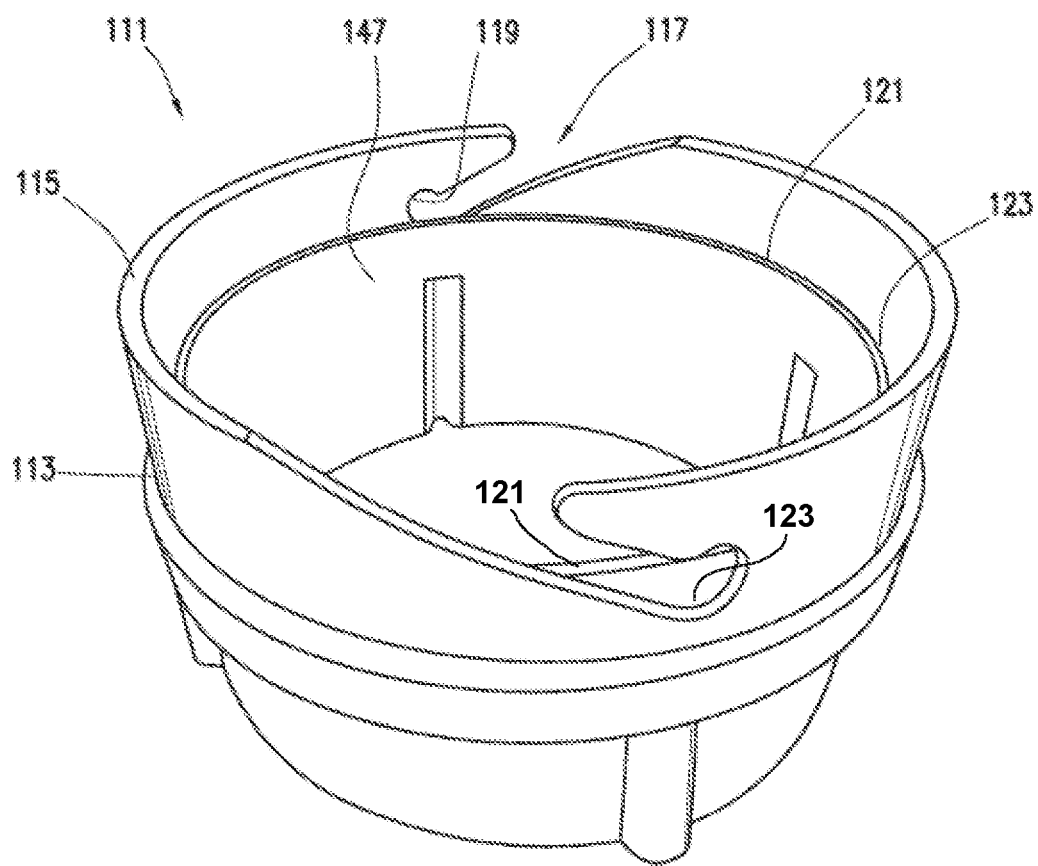
FIG. 5 is a perspective view of a female duct coupler of the duct coupler assembly of FIG. 2.

In some embodiments, female duct coupler 111, depicted in FIG. 5, may include bayonet slot 117. Bayonet slot 117 may be formed as a slot in female duct coupler body 113. In some embodiments, bayonet slot 117 may extend from female edge 115 of female duct coupler 111. Bayonet slot 117 may be formed along a generally helical path in female duct coupler body 113.

Figure 6:
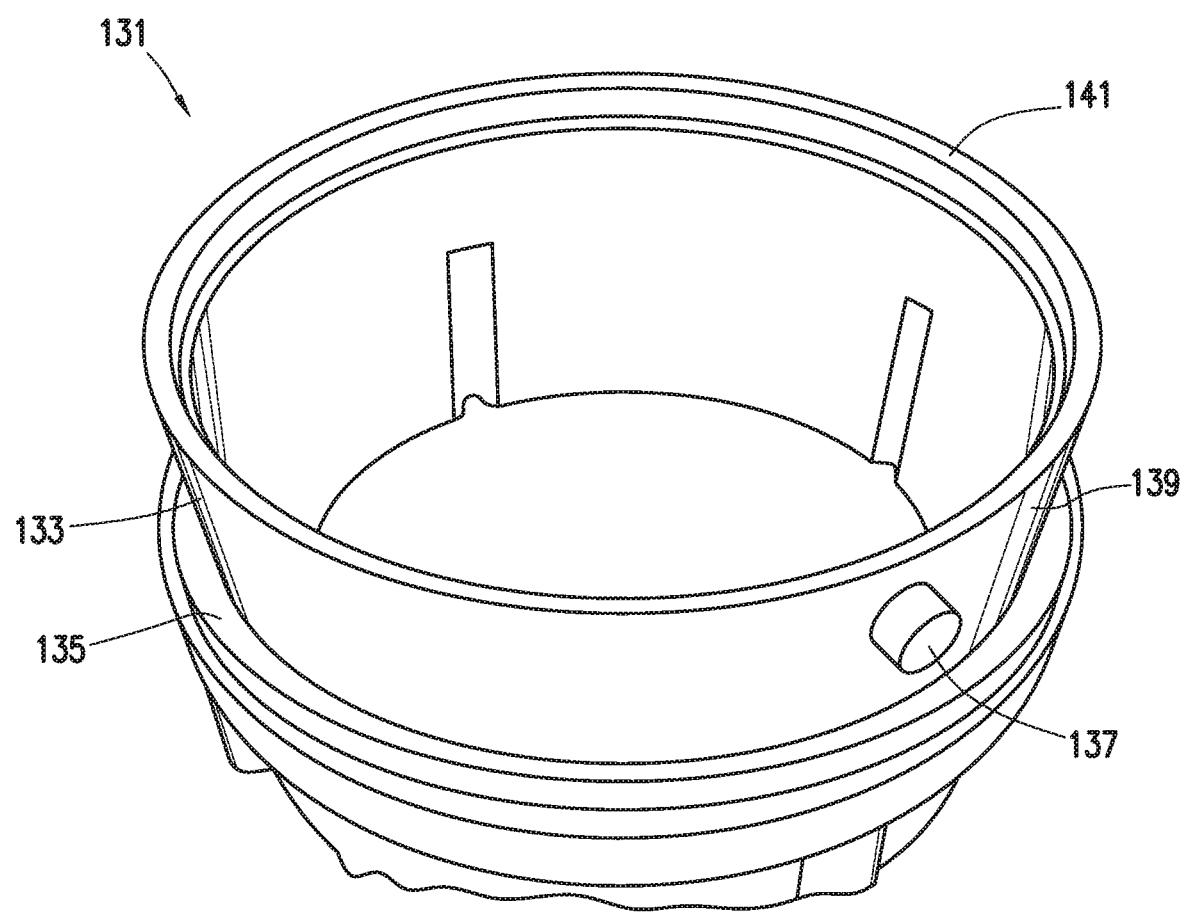
FIG. 6 is a perspective view of a male duct coupler of the duct coupler assembly of FIG. 2.
Figure 7:
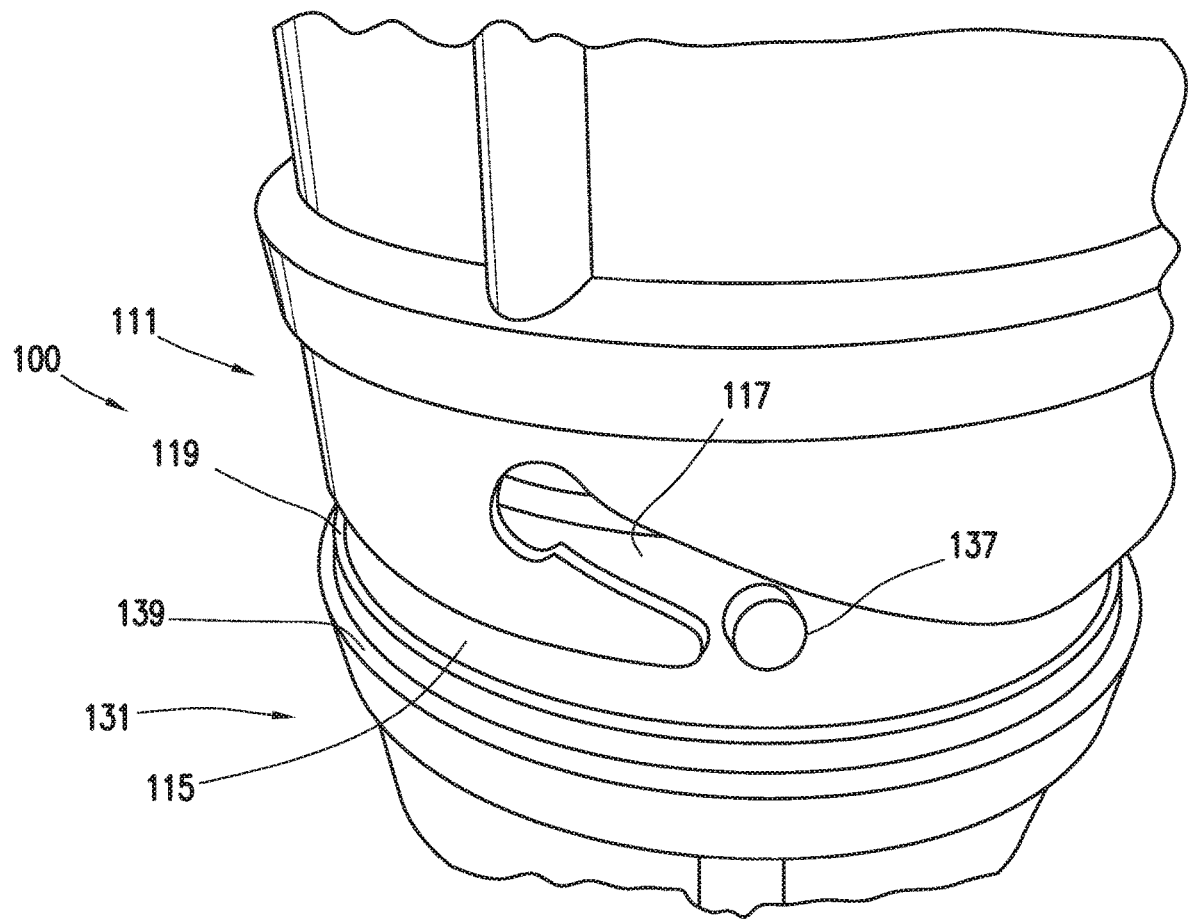
FIG. 7 is a detail view of the duct coupler assembly of FIG. 2 in an unlocked position.

In some embodiments, male duct coupler 131, depicted in detail in FIG. 6, may include bayonet post 137. Bayonet post 137 may extend from the outer surface 139 of male duct coupler body 133. When male duct coupler 131 is coupled with female duct coupler 111, bayonet post 137 may be aligned with bayonet slot 117 as depicted in FIG. 7 and pressed thereinto.

By rotating male duct coupler 131, bayonet post 137 may follow the helical path of bayonet slot 117, drawing male duct coupler body 133 further into female duct coupler body 113 as depicted in FIG. 2. In some embodiments, bayonet slot 117 may include a flat or detent 119, shown in detail in FIG. 5, positioned to retain bayonet post 137 in bayonet slot 117. In some embodiments, flat or detent 119 may retain bayonet post 137 by elastic tension between female duct coupler body 113 and male duct coupler body 133.

In some embodiments, as depicted in FIG. 4, female duct coupler 111 may further include inner flange 121. Inner flange 121 may be positioned within female duct coupler body 113. Inner flange 121 may have outer surface 121a having an outer diameter smaller than the inner diameter of inner surface 133a of male duct coupler body 133. In some embodiments, inner flange 121 may form seal groove 123. Male edge 141 of male duct coupler 131 may enter seal groove 123. In some embodiments, a seal body 125, such as an O-ring or other gasket, may be positioned within seal groove 123 to form a seal against male edge 141 of male duct coupler 131.

Figure 8A:
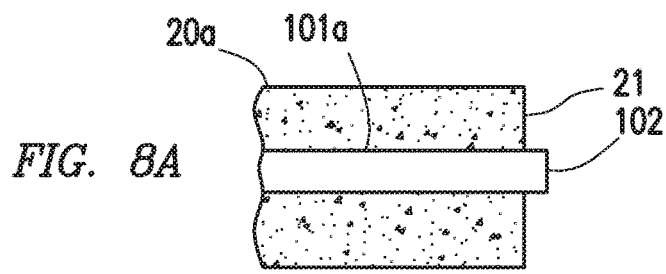
FIGS. 8A-8E depict an operation consistent with at least one embodiment of the present disclosure.
Figure 8B:
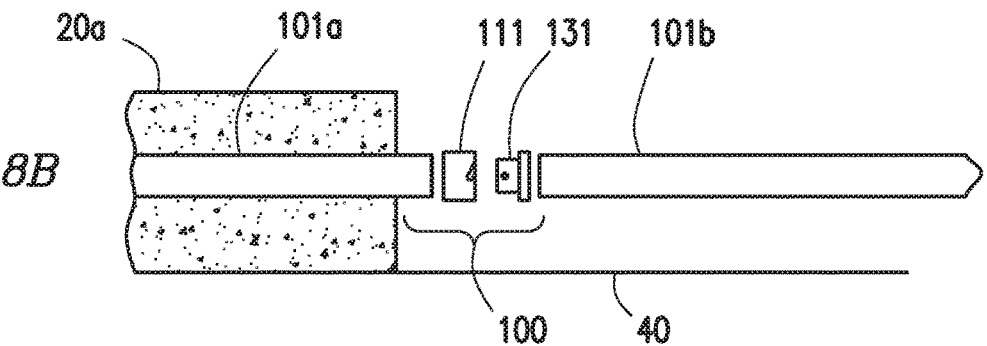
Figure 8C:
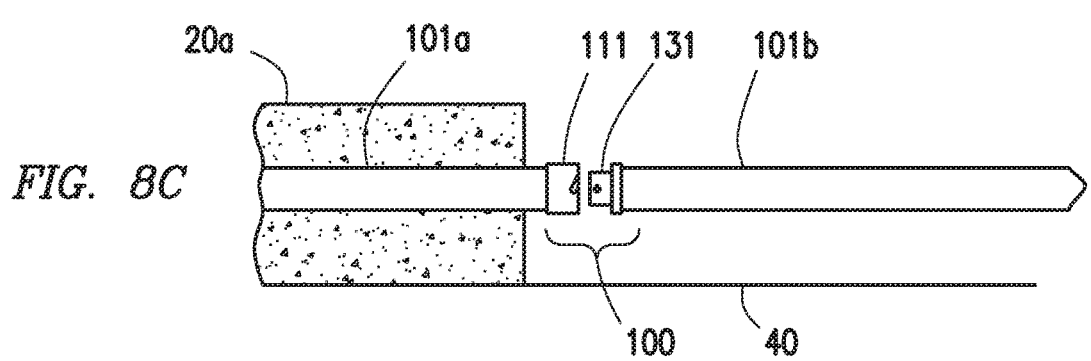

In operation, with respect to FIGS. 8A-8E, first concrete element 20a may be formed with first duct segment 101a positioned therein. As depicted in FIG. 8A, first duct end 102 of first duct segment 101a may extend past end 21 of first concrete element end 21 of first concrete element 20a. Form 40 may be constructed or positioned next to first concrete element 20a as depicted in FIG. 8B. A first duct coupler of duct coupler assembly 100, here depicted as female duct coupler 111 may be provided and coupled to first duct segment 101a as depicted in FIG. 8C. A second duct coupler of duct coupler assembly 100, here depicted as male duct coupler 131 may be coupled to second duct segment 101b. As previously discussed, this arrangement is merely exemplary and not intended to be limiting. In some embodiments, male duct coupler 131 may be coupled to first duct segment 101a and female duct coupler 111 may be coupled to second duct segment 101b without deviating from the scope of this disclosure.

Figure 8D:
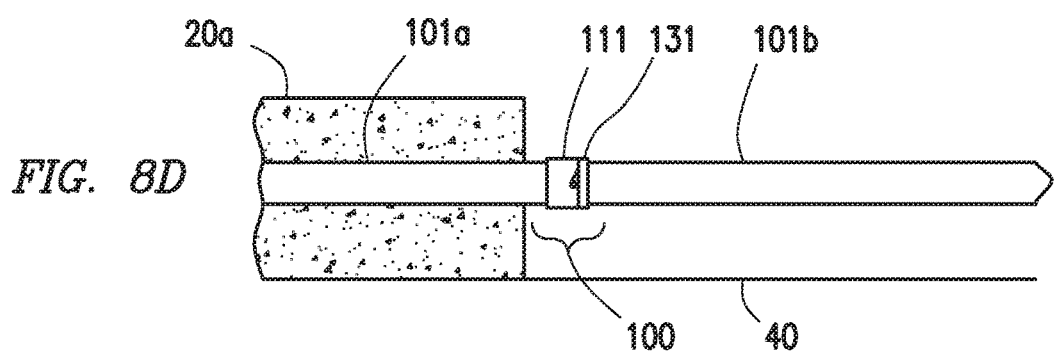
Figure 8E:
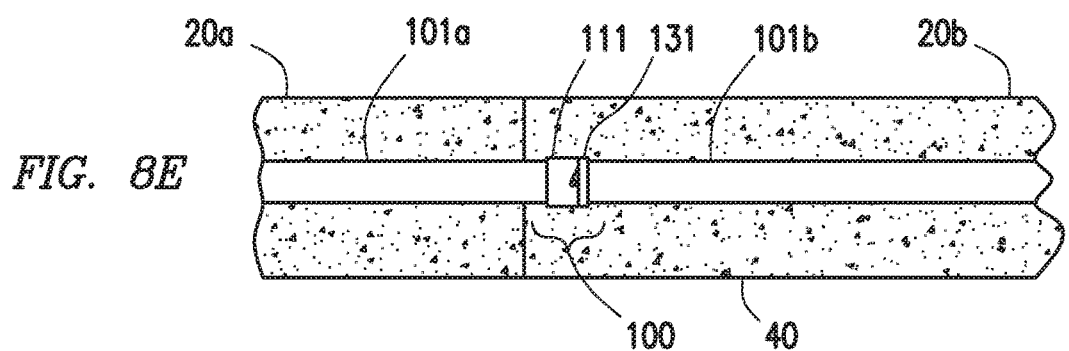

As depicted in FIG. 8D, male duct coupler 131 may be inserted into female duct coupler 111, and male duct coupler 131 and second duct segment 101b may be rotated as described herein to lock male duct coupler 131 to female duct coupler 111. As depicted in FIG. 8E, second concrete element 20b may then be formed within form 40 by, for example and without limitation, pouring.

In some embodiments, although discussed herein above as used to couple duct segments 101a and 101b within two concrete elements 20a and 20b, one having ordinary skill in the art with the benefit of this disclosure will understand that duct coupler assembly 100 may be used to couple duct segments 101a and 101b in a single concrete element without deviating from the scope of this disclosure.

Although depicted as circular and discussed with respect to "diameters", one having ordinary skill in the art with the benefit of this disclosure will understand that female duct coupler 111 and male duct coupler 131 need not be circular without deviating from the scope of this disclosure. For example and without limitation, female duct coupler 111 and male duct coupler 131 may be circular, ellipsoidal, triangular, square, or any other shape in cross section.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A method comprising:
forming a first concrete element, the first concrete element having a first duct segment positioned therein and extending from an end of a first concrete element;
positioning a form adjacent to the end of the first concrete element;
providing a duct coupler assembly, the duct coupler assembly including:
a female duct coupler, the female duct coupler including a female duct coupler body having an inner surface having an inner diameter, the female duct coupler having a bayonet slot, the female duct coupler body having a longitudinally facing female edge; and
a male duct coupler, the male duct coupler including a male duct coupler body having an outer surface having an outer diameter, the outer diameter smaller than the inner diameter of the inner surface of the female duct coupler body, the male duct coupler having a bayonet post extending from an outer surface of the male duct coupler body, wherein the male duct coupler further comprises a male coupler flange defining a longitudinally facing male edge;
coupling the female duct coupler of the duct coupler assembly to the first duct segment;
coupling the male duct coupler of the duct coupler assembly to a second duct segment;
coupling the second duct segment to the first duct segment by:
inserting the male duct coupler into the female duct coupler such that the bayonet post enters the bayonet slot, the longitudinally facing male edge abutting the longitudinally facing female edge of the female duct coupler, so as to resist further insertion of the male duct coupler body into the female duct coupler body; and
rotating the second duct segment to retain the bayonet post in the bayonet slot; and
pouring concrete into the form to form a second concrete element having the second duct section positioned therein and then tensioning after the poured concrete has set.

2. The method of claim 1, wherein the first and second duct couplers are coupled to the first and second duct segments respectively by one or more of press fitting, mechanical welding, chemical welding, friction welding, thermal coupling or welding, using a shrink sleeve, using an O-ring or diametric seal, or using one or more adhesives.

3. The method of claim 1, wherein the step of rotating the second duct segment further comprises locking the male duct coupler to the female duct coupler.

4. The method of claim 1, wherein the duct coupler assembly further comprises a seal positioned within a seal groove.

5. The method of claim 4, further comprising sealing the female duct coupler to the male duct coupler.

6. The method of claim 1, wherein the step of rotating the second duct segment to engage the bayonet post into the bayonet slot is performed along a helical path.

7. The method of claim 1 further comprising contacting the bayonet post with a detent or flat formed in the bayonet slot.

8. The method of claim 7, further comprising retaining the bayonet post by elastic tension.

9. The method of claim 1 further comprising coupling the female and male duct couplers to the first and second duct segments respectively by press fitting, mechanical welding, chemical welding, friction welding, thermal coupling, thermal welding, a shrink sleeve, an O-ring or diametric seal, or an adhesive.

10. The method of claim 1, wherein the female duct coupler further comprises an inner flange, the inner flange positioned within the female duct coupler body, the inner flange and female duct coupler body defining a seal groove therebetween, the method further comprising receiving a male edge of the male duct coupler body within the seal groove.

11. The method of claim 10 further comprising positioning a seal within the seal groove.

12. The method of claim 1 further comprising threading a tensioning member through the male and female duct couplers.

13. The method of claim 1, wherein at least one of the duct couplers is formed integrally as an end of the first or second duct segments.

* * * * *